Patented Nov. 14, 1950

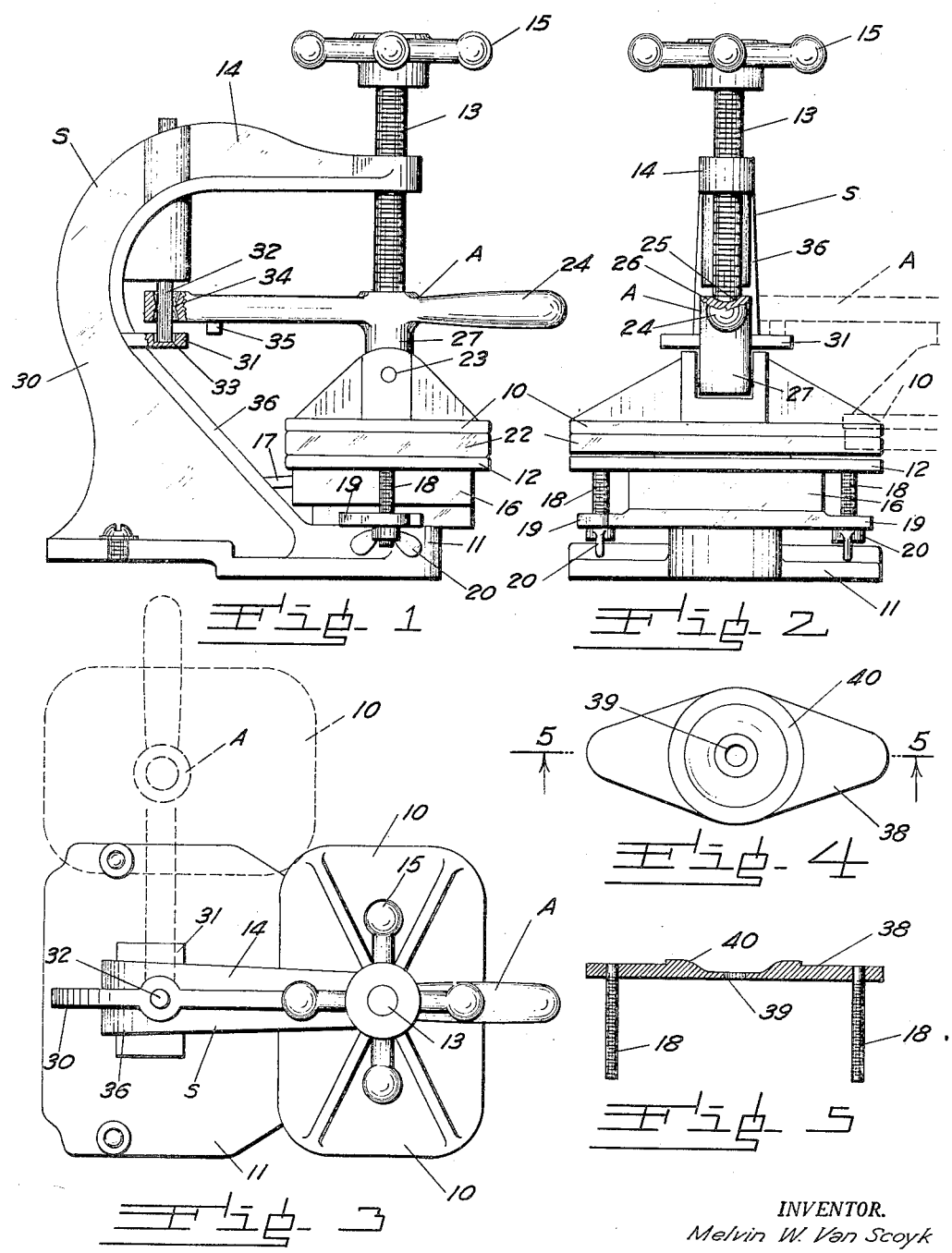

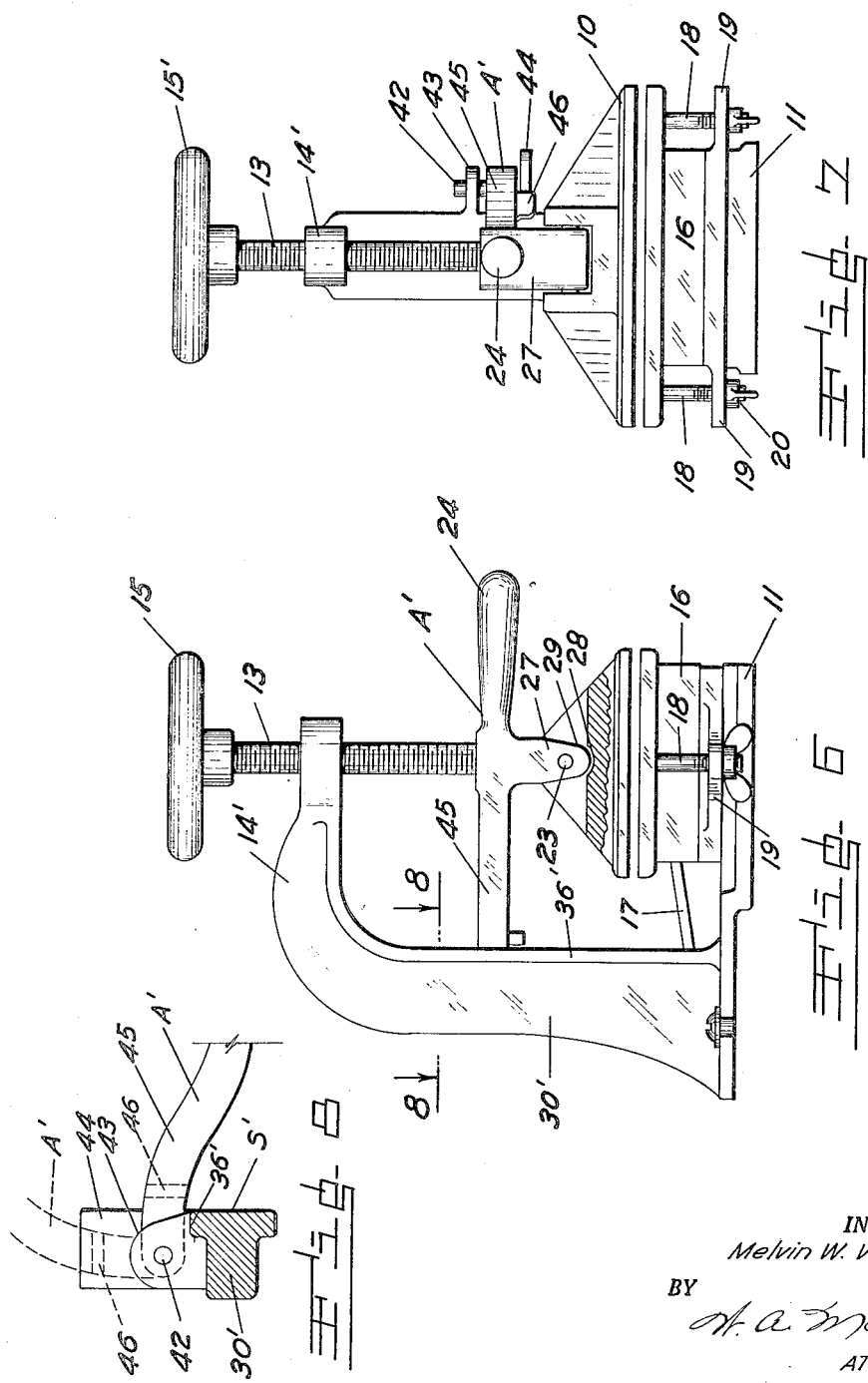

2,529,522

UNITED STATES PATENT OFFICE 2,529,522

VULCANIZING MOLD PRESS

Melvin W. Van Scoyk, Denver, Colo., assignor to Winner Equipment Company, Denver, Colo., a corporation of Colorado Application April 9, 1946, Serial No. 660,668

2 Claims. (Cl. 18—18)

This invention relates to devices, commonly called tube plates, for repairing or reconstructing articles made of rubber, such as inner tubes for automobile tires, rubber belting, and similar articles.

In the repair of inner tubes or the like, a patch may be applied over the section to be repaired, as by coating a rubber patch and/or a corresponding section of the tube with uncured rubber or so-called inner tube repair gum. Heat and pressure are then applied to the tube and patch to cook or cure the rubber joint between the patch and the tube. The desired temperature and pressure may be obtained by clamping the tube section between upper and lower plates and heating one or both of the plates, as by an electrical resistance element or by steam. Other flat rubber articles, such as rubber belts, may be repaired in the same manner.

Previous tube plates are rather slow and cumbersome in operation if constructed so that sufficient pressure for a proper repair can be produced. Also, such devices require considerable attention on the part of an operator, and do not always produce uniform results. In many of the devices, the operations required to bring the upper and lower plates together in a clamping position on the inner tube to be repaired, are quite complicated.

Among the objects of this invention are to provide an improved tube plate; to provide a tube plate in which adequate pressure between the upper and lower plates is obtained, yet the plates may be readily separated so that a repaired tube may be quickly removed and the next tube to be repaired quickly and conveniently inserted; to provide such an improved tube plate in which the upper and lower plates remain accurately in alignment; to provide such an improved tube plate in which the upper plate may be moved to an unobstructing position for removal of a repaired tube and/or placement of the next tube; to provide such an improved tube plate in which the clamping pressure is sufficiently great to produce the desired results; and to provide an improved tube plate which is relatively simple in construction, and may be made in various forms.

The above and other objects are attained, in accordance with this invention, by mounting the upper plate on a pivoted or swinging horizontal arm, and providing a clamping screw or the like for exerting pressure against the upper plate when in clamping position. A cooperating boss and shelf are utilized in maintaining the arm and upper plate in substantially horizontal position when moved to the side or unobstructing position. The arm may be pivoted on a vertical pin and provided with a beveled hole to increase the permissible vertical movement of the arm. The above and other features of this invention are included in the tube plates illustrated in the accompanying drawings, in which:

Fig. 1 is a side elevation of a tube plate constructed in accordance with this invention;

Fig. 2 is a front elevation of the tube plate of Fig. 1;

Fig. 3 is a top plan view thereof;

Fig. 4 is a top plan view of an auxiliary clamping device utilized in making repairs at valve stems of inner tubes;

Fig. 5 is a vertical section taken along line 5—5 of Fig. 4;

Fig. 6 is a side elevation of a tube plate forming another embodiment of this invention;

Fig. 7 is a front elevation of the tube plate of Fig. 6; and

Fig. 8 is a partial horizontal section taken along line 8—8 of Fig. 6.

One embodiment of this invention, as illustrated in Figs. 1 to 3, inclusive, comprises a support S on which is pivoted a horizontally movable arm A, a lower plate 12 supported on a base 11 of support S, and an upper plate 10 attached to arm A and movable therewith. A section of an inner tube or the like, to which a patch is to be attached for repair purposes, is clamped between the upper and lower plates through pressure exerted by a screw 13, which engages a threaded aperture at the end of an overhanging arm 14 of Support S. Screw 13 is turned by a hand wheel 15, to obtain the desired clamping pressure, and either the upper plate or the lower plate may be heated, as by a heating unit 16 containing a resistance heating element and supplied electricity in a suitable manner, as by a cord 17.

The lower plate 12 and heating unit 16 are mounted in a stationary position, as by being clamped by screws 18 which are formed integrally with or permanently attached, as by welding, to lower plate 12. Screws 18 extend downwardly from plate 12 and through slots formed in lugs 19 which extend laterally from base 11 of support S, the attachment being made by tightening wing nuts 20.

The upper plate 10 is provided with a pad 22, formed of rubber or other suitable resilient material, to feather out repairs, and is attached by a pin 23 to pivoted arm A. The latter has a handle 24 by which the upper plate 10 may be swung from the full to the dotted positions of Figs. 2 and 3, and vice versa. The lower end 25 of screw 13 is rounded, and seats in a round socket 26 formed in the upper surface of arm A, directly above a depending boss 27 adapted to bear against upper plate 10. If desired, as in Fig. 6, the bearing surface of plate 10 may be provided with a laterally extending, rounded groove 28, adapted to receive the rounded lower end 29 of boss 27, which preferably tapers at front and back, as shown.

Support S also includes an upstanding leg 30, at the upper end of which is overhanging arm 14, and centrally of which is a horizontal shelf 31, as in Fig. 2, which may extend to one or both sides, as shown. A pivot pin 32, for arm A, extends through a vertical hole into the upper portion of the support S, and into a socket 33 in shelf 31. Arm A is provided with a hole 34, preferably beveled or tapered circularly from the center outwardly to each end, as shown, to permit considerable latitude in vertical movement of arm A, thereby enabling the tube plate to accommodate different thicknesses of articles to be repaired.

Arm A is also provided with a depending boss 35, normally disposed in front of shelf 31, but adapted to rest on the shelf to maintain arm A in substantially a horizontal position, as when the arm A and upper plate 10 are swung to the dotted position of Figs. 2 and 3. This maintains arm A in a convenient position to be swung back after a new setup is made on the plates, and also insures that there will be sufficient clearance between the plates as the upper plate is being swung back to the clamping or full position of Figs. 1 to 3, to prevent disturbance of the setup. Flange 36 of support S acts as a stop to prevent arm A from being moved rearwardly off the shelf 31, whether swung to either side.

As soon as the upper plate is swung to the clamping position, screw 13 is rotated, so as to produce the desired clamping pressure between the plates. The heating element may be already on, or have been turned on previously, so as to heat the lower plate to the desired temperature. Thus, with a patch or repair material over the portion to be repaired, and uncured rubber or other suitable material between the patch and tube, the heat and pressure produced between the plates 10 and 12 will cause the patch to be vulcanized, or united with the tube. As soon as the tube to be repaired has received sufficient treatment, screw 13 is unscrewed a few turns, merely to lift the lower end of the screw out of the socket 26, and the arm A is swung to the side, as to the dotted position of Figs. 2 and 3. Boss 35 rests on shelf 31, to maintain arm A in substantially a horizontal position, until the next repair operation. The connection between pin 23 and arm A is preferably sufficiently loose so that upper plate 10 merely hangs from the arm when swung to the side, and pin 23 does not interfere with the desired contact between the lower end 29 of boss 27 and groove 28 of plate 10.

When the portion to be repaired surrounds or is adjacent the valve stem, an alternative lower plate 38, illustrated in Figs. 4 and 5, may be substituted for the lower plate 12. Alternative plate 38 is provided with a central hole 39 to accommodate the valve stem, and a circular boss 40 which conforms to the normal shape of the tube around the valve stem base. Plate 38 is also provided with screws 18, attached to or formed integrally with the plate. Thus, merely by substituting plate 38 for plate 12, repairs around and adjacent the valve stem can readily be made. Or, if desired, the upper surface of heating unit 16 may be formed similarly to the upper surface of plate 38, a hole 39 also being formed in the heating unit, so that repairs around valve stems may be made merely by removing lower plate 12 and utilizing the heating unit as a lower plate.

In the second embodiment of this invention, illustrated in Figs. 6 to 8, inclusive, the upper plate 10 and lower plate 12, as well as heating unit 16, may be substantially identical with those of the first embodiment. However, leg 30' of support S' is straighter, and arm A' is pivoted on a pin 42, mounted between an ear 43 and a shelf 44 at one side of leg 30' of support S'. Arm A' is provided with a curved section 45 adjacent the inner end, to clear support S', and is preferably provided with a hole for pin 42 similar to hole 34 of arm A, as shown in Fig. 1. Also, arm A' is provided with a handle 24, a socket for screw 13, and a depending boss 27 opposite the screw, boss 27 being tapered at front and back and having a rounded lower end 29 to fit into groove 28 of plate 10, as indicated previously. Upper plate 10 is attached to arm A' by a pin 23, in the same manner as in the first embodiment, and clamping pressure is similarly produced by turning a hand wheel 15' of screw 13, which threadedly engages a corresponding threaded aperture adjacent the end of an overhanging arm 14' of support S'.

The operations involved in the use of the second embodiment are similar to those of the first embodiment, except that arm A' is swung only to one side instead of either side, as to the dotted position of Fig. 8, the arm being provided with a depending boss 46 adapted to rest on shelf 44. Also, flange 36' of support S' acts as a stop to prevent movement of arm A' in the wrong direction, as will be evident from Fig. 8. If desired, the rear end of arm A' may be adapted to abut against the rear side of flange 36' or against leg 30', to limit rearward movement of the arm.

From the foregoing, it will be apparent that the tube plate of this invention fulfills to a marked degree the requirements and objects hereinbefore set forth. The combination of a pivoted arm carrying the upper plate, and a screw or similar clamping means for producing pressure between the plates, renders operation of the device simple and easy. An operator can perform a greater number of repair operations when little time is necessary for removing a repaired tube and placing the next tube to be repaired in position. A pivoted arm having a depending boss adapted to rest upon a shelf when the arm is swung to a rear position, assists the operator in quickly moving the arm and upper plate back to treatment position as soon as the next article to be treated is positioned. The combination of a screw having a rounded end, and an arm having a socket to receive the same, as well as the further combination of a laterally extended, rounded surface on the lower portion of the arm, and a cylindrical groove in the plate to receive such rounded surface, produces a more accurate and equalized pressure against the article to be repaired, thus compensating for irregularities in thickness.

It will be understood that, although two embodiments of this invention have been described, other embodiments may exist and various changes may be made in either embodiment. Thus, a cam operated clamping device may be substituted for the clamping screw, although a higher pressure may usually be obtained by the screw and a cam does not provide the self-centering action of a screw having a rounded end and an arm having a socket to receive the same.

It will be further understood that various other changes may be made, without departing from the spirit and scope of this invention.

What is claimed is:

1. A tube plate comprising a support including a base and an overhanging arm; a lower plate mounted on said base; a horizontally movable arm pivoted on said support; an upper plate attached to said pivoted arm; a shelf extending from said support beneath the pivoted end of said arm; a boss on the lower side of said pivoted arm and adapted to rest on said shelf to maintain said arm in substantially a horizontal position when moved to one side; means for producing pressure between said upper and lower plates and mounted on the end of said overhanging arm; and means for heating an article clamped between said plates.

2. A tube plate comprising a support including a base, an overhanging arm, a horizontally extending shelf spaced above said base, and a vertical pin extending upwardly from said shelf; a lower plate mounted on said base; a horizontally movable arm pivoted on said pin, said arm having a beveled hole through which said pin extends and a depending boss adapted to rest on said shelf to maintain said arm in substantially horizontal position when said arm is moved to the side; an upper plate attached to said pivoted arm; a screw mounted on said overhanding arm for producing pressure between said upper and lower plates, said movable arm having a socket for receiving the lower end of said screw; a second boss depending from said pivoted arm beneath said socket for engaging said upper plate, said boss terminating in a substantially semi-cylindrical surface and said upper plate having a substantially semi-cylindrical groove for receiving said cylindrical surface; a pin extending laterally through the lower end of said second boss for attaching said upper plate to said arm; and means for heating an article clamped between said plates.

MELVIN W. VAN SCOYK.

REFERENCES CITED

The following references are of record in the file of this patent:

UNITED STATES PATENTS

| Number | Name | Date |
|---|---|---|
| 2,219,419 | Jacobus | Oct. 29, 1940 |
| 2,290,106 | Longstreet | July 14, 1942 |
| 2,292,485 | Slatkin | Aug. 11, 1942 |